UNITED STATES PATENT OFFICE.

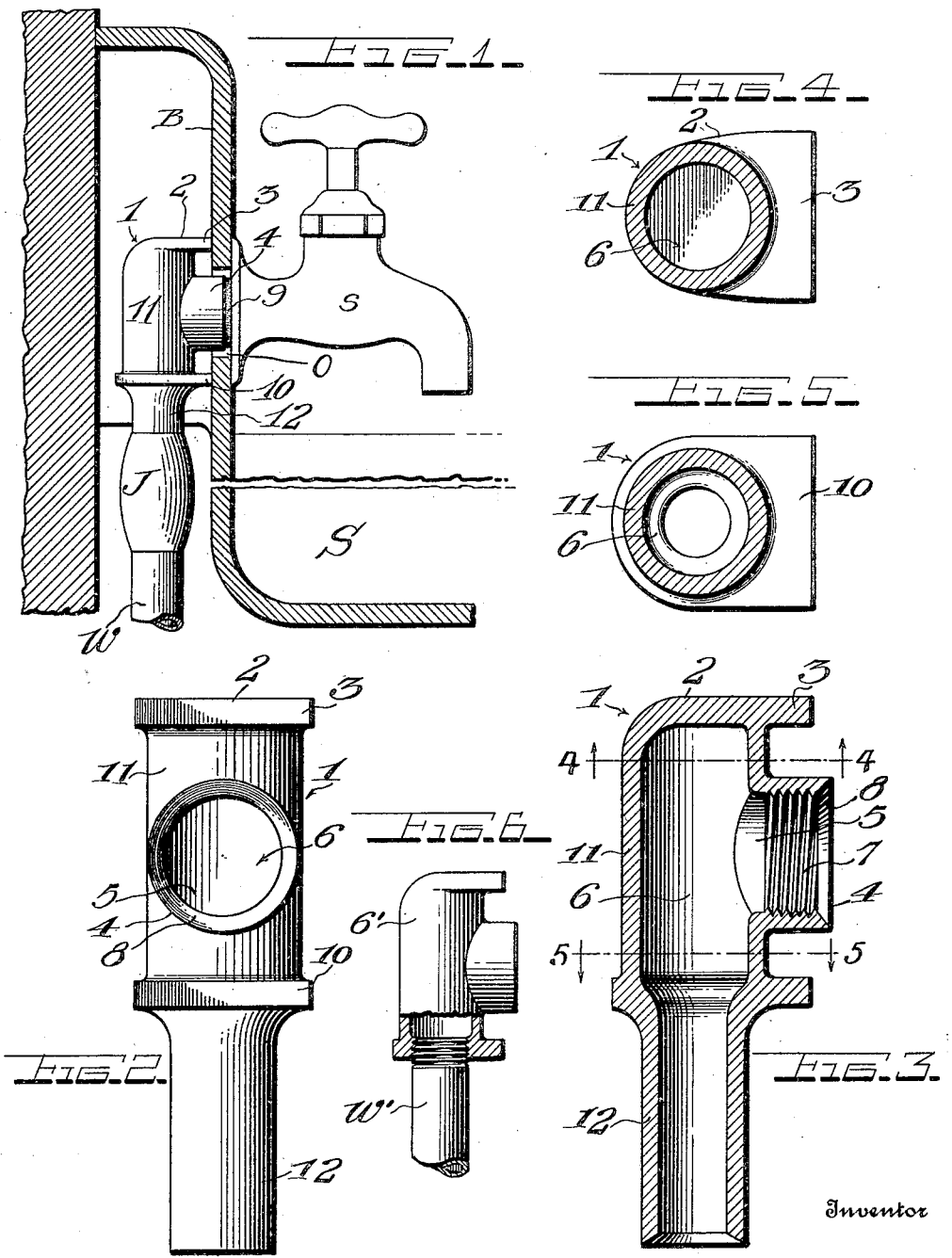

GEORGE J. VON GLAHN, OF BROOKLYN, NEW YORK.

PIPE-FITTING.

1,137,556.  Specification of Letters Patent.  Patented Apr. 27, 1915.

Application filed July 30, 1914. Serial No. 854,078.

*To all whom it may concern:*

Be it known that I, GEORGE J. VON GLAHN, a citizen of the United States, residing at Brooklyn, in the county of Kings and State of New York, have invented certain new and useful Improvements in Pipe-Fittings; and I do declare the following to be a full, clear, and exact description of the invention, such as will enable others skilled in the art to which it appertains to make and use the same.

My invention relates to improvements in pipe fittings and has for its object to provide a simply constructed casting for the attachment of a water supply pipe and a spigot to the rear wall of a sink, wash-stand, wash-tub, bath-tub or analogous device.

In carrying out the above end the invention aims to provide a fitting by the use of which the spigot may be rigidly clamped at all times and held against vibration.

With the above object in view the invention resides in certain novel features of construction and combination herein described and claimed and shown in the accompanying drawings wherein—

Figure 1 is a vertical section through a portion of a kitchen sink showing the application of my invention. Fig. 2 is an edge view of one form of the fitting. Fig. 3 is a vertical section thereof; Figs. 4 and 5 are horizontal sections taken respectively on the lines 4—4 and 5—5 of Fig. 3 looking in the direction of the arrows; and, Fig. 6 is a view similar to Fig. 3 showing a slightly different form of construction.

In the accompanying drawings, I have shown a portion of a kitchen sink S which is provided with the usual back B which may be formed integrally therewith or as a separate unit, said back being provided with an opening O at a suitable point through which the threaded shank of a spigot S is adapted to pass.

For the purpose of establishing communication between the water supply pipe W and the spigot S, I provide my improved fitting 1 the latter being shown, from Figs. 1 to 5 inclusive, as comprising an upright pipe section having its lower end open while its upper end is closed by a horizontally disposed integral top plate 2 one edge of which is extended beyond the wall of the fitting to provide a horizontal flange 3. Directly beneath the flange 3, a hollow boss 4 projects laterally from said fitting and is here shown as provided with a bore 5 registering with the bore 6 of the pipe section, the bore 5 being here shown as provided with internal screw threads 7 adapted to interengage similar threads (not shown) formed on the shank of the spigot S. The outer end of the boss 4 is preferably chamfered as indicated at 8 in order that a packing gasket 9 which is interposed between said boss and the spigot S, may be forced into binding frictional contact with the shank of the spigot thereby preventing leakage at this point. Directly beneath the boss 4, a second flange 10 extends laterally from the upright pipe section, the flanges 3 and 10 both having their outer ends cut on lines lying at right angles to the axis of the boss 4 and disposed in the same upright plane, whereby, when the parts stand as seen in Fig. 1, said ends of the flanges will contact with the rear side of the back B, and when the shank of the spigot is threaded into the boss 4, will hold said spigot positively against vibration.

By reference to the first five figures of the drawings, it will be seen that the upright pipe section hereinbefore mentioned comprises a hollow upright cylindrical head 11 which is equipped with the boss 4 at its central portion, with the flanges 3 and 10 at its upper and lower ends and with a depending contracted neck 12 by means of which the coupling may be connected to the water pipe W by a lead coupling J or otherwise.

In Fig. 6, I have shown a slightly different form of construction in which the neck 12 is entirely dispensed with, the supply pipe W' being adapted to be threaded into the lower end of the head 6' when the parts are constructed in this manner.

From the foregoing description, taken in connection with the accompanying drawings it will be seen that I have produced an extremely simple pipe fitting and yet one which will form a rigid connection between a water supply pipe and a spigot and one which will absolutely prevent vibrating of either part.

Having thus described my invention, what I claim is:

A pipe fitting comprising an upright hollow cylindrical head, a hollow boss projecting laterally from the intermediate portion thereof, said boss having its outer end internally threaded, a horizontal top plate formed integrally with and closing the upper end of the head, said top plate having one of its edges extended laterally over the boss to form a flange, a second horizontal flange formed integrally with the lower end portion of the head and projecting laterally under the boss, and a contracted neck depending from the head, the outer end of the flanges being adapted to bear against a fitting.

In testimony whereof I have hereunto set my hand in presence of two subscribing witnesses.

GEORGE J. VON GLAHN.

Witnesses:
 GEORGE J. GUNKEL,
 FREDERICK S. KRUPP.